ROBERT N. GOLDMAN
RONALD A. KATZ
INVENTORS.

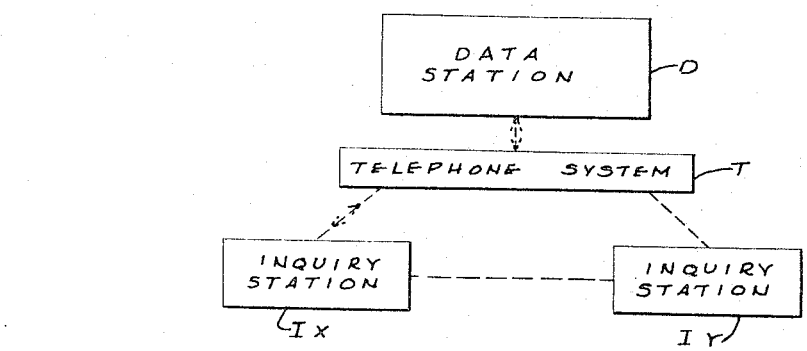
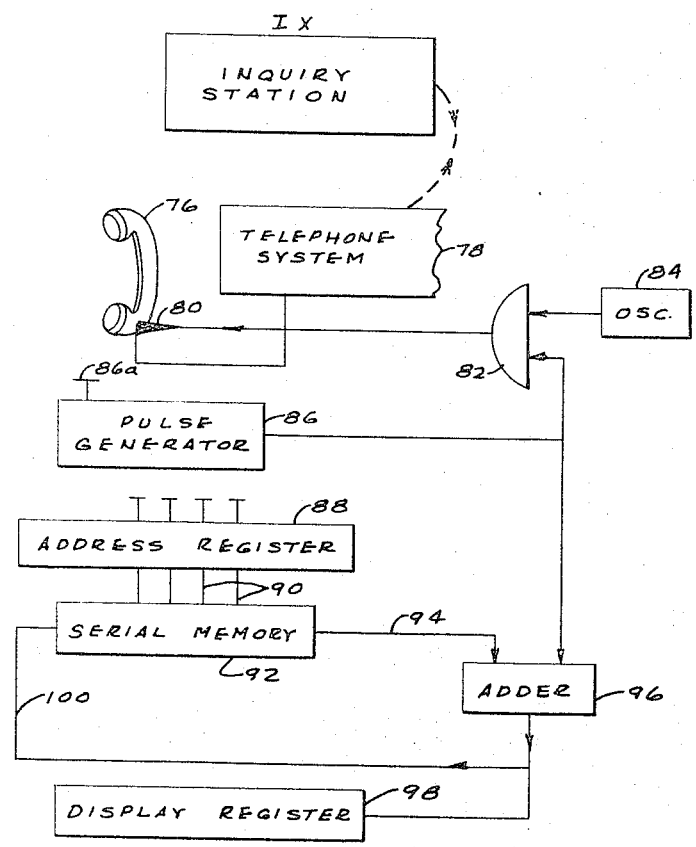

United States Patent Office 3,307,147
Patented Feb. 28, 1967

3,307,147
TELEPHONE VERIFICATION SYSTEM
Robert N. Goldman and Ronald A. Katz, Los Angeles, Calif., assignors to Telecredit, Inc., Wilmington, Del., a corporation of Delaware
Filed Apr. 12, 1962, Ser. No. 187,051
10 Claims. (Cl. 340—150)

The present invention relates to a verification system, as for use in telephonic communication to verify that communication is established with a telephone station as represented.

Telephonic communication has come into widespread use for many business transactions wherein the proper identification of the communicating parties is important. For example, information is sometimes provided by telephone to clientele, who pay for the information. Credit information services, as a specific example, often provide credit information to persons calling by telephone, with virtually no assurance that the calling party is a paying client. Therefore, unauthorized persons may sometimes avail themselves of a service intended to be provided to a select group, by simply telephoning the station from which information is obtained, and identifying themselves as an authorized client. In a specific example, a former employee of a subscriber company may desire credit information on a person registered with the credit service. To obtain such information the former employee may simply call the credit service company and identify himself as representing his former employer. In such situation, the inquiring person normally obtains the information he desires at the expense of either the credit service company or his former employer.

Of course, the expense of providing information to unauthorized persons can be avoided by the use of a private communication system. However, in general, the expense of such a system, relative to the cost of using regular telephone communication, normally requires such an arrangement impractical.

In some situations of this type, various codes have been assigned to identify authorized persons in telephonic communication. However, these codes often become well known to unauthorized persons, and furthermore, considerable time and effort is required to determine the validity of each assertedly-valid code. As a result, the use of code systems have at best only discouraged a few unauthorized persons from using the service.

Still another proposed solution to this problem has involved the provision of coded information to the inquirer. However, again, the codes become well known if used for prolonged periods of time, and additionally they cause considerable confusion. Therefore, in spite of this and various other proposed solutions to the problem as return calling, a need remains for an accurate, economical and effective system to verify that persons inquiring by telephone are authorized clients.

In general, the present invention comprises a verification or identification apparatus for use in conjunction with a conventional telephone system, which apparatus is provided at the data station and functions with a plurality of approved inquiring stations, to verify the inquiring stations at the data station. In the system, a plurality of registers are individually associated with the inquiring stations for registering code signals which identify each particular inquiring station. Plural register means are also present at the data station for registering the code signals identifying each of the data inquiry stations. The system then incorporates means for varying these code signals during telephonic communication between an inquiry station and the data station, so that the code signals are repeatedly changed. The system may also include apparatus to compare the code signals from the inquiring station and the code signals registered to identify that station. Of course, a conicidence in the two sets of signals indicates that the inquiring station is the authorized client.

An object of the present invention is to provide an improved system for use with conventional public telephone apparatus, for verifying one telephone station at a second telephone station.

Another object of the present invention is to provide an improved apparatus for verifying the existence of communication between two telephonic stations.

Still another object of the present invention is to provide a telephonic verifying system which is economical and simple to use.

A further object of the present invention is to provide a system for verifying at one telephone station that communication is established with another select telephone station, which system is reliable and economical.

These and other objects and advantages of the present invention will become apparent from a consideration of the following description, taken in conjunction with the drawings, wherein:

FIGURE 1 is a block diagram of a system incorporating the present invention;

FIGURE 3 is a block and perspective diagram of an alternative embodiment for the system of FIGURE 1.

Figure 2:
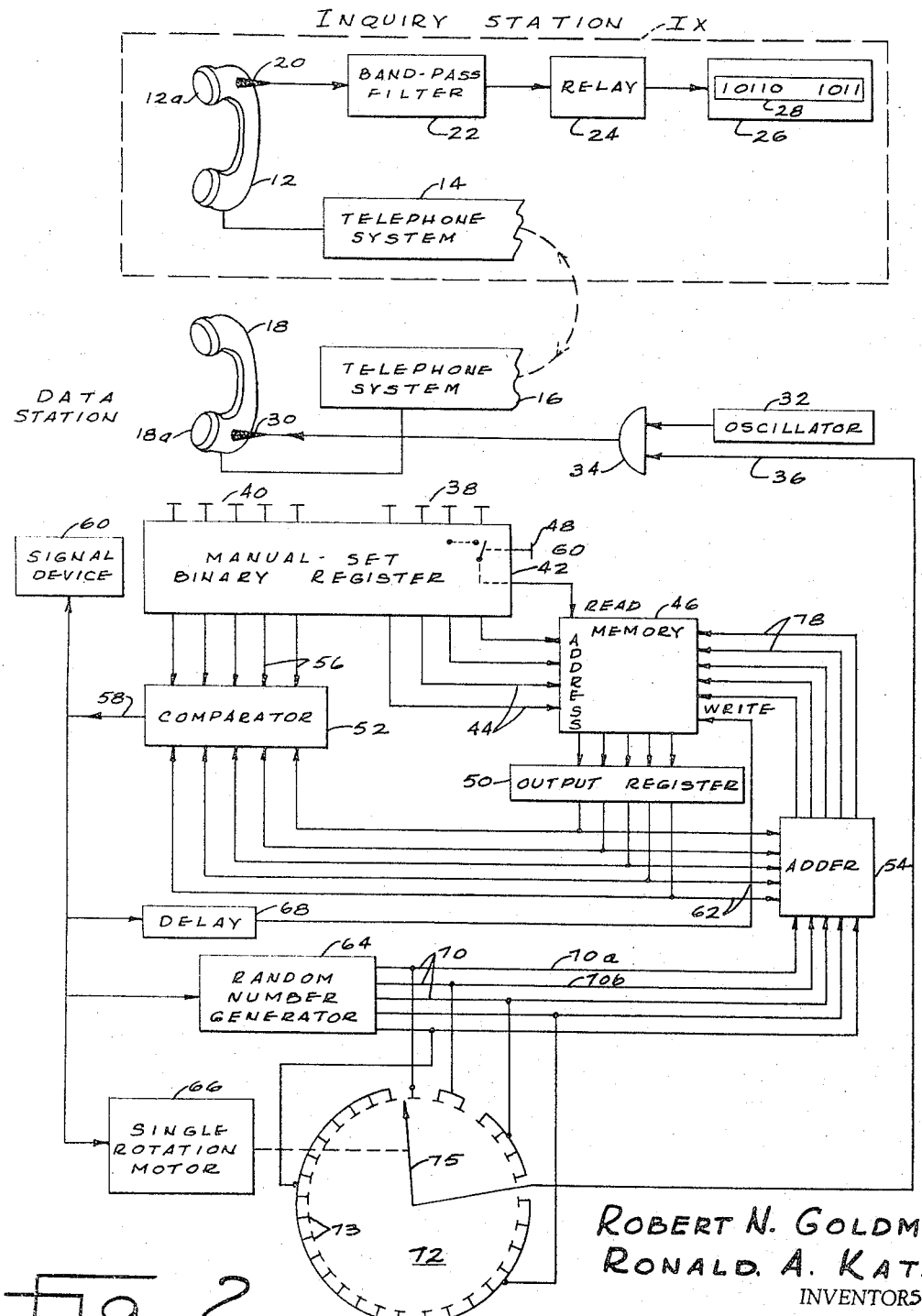
FIGURE 2 is a block and perspective diagram of a detailed portion of the system of FIGURE 1.

Referring initially to FIGURE 1, there is shown a data station D served by a telephone system T which system also serves a plurality of inquiry stations IX through IY. The data station D may, for example, comprise the location of records containing information which is provided on request to the inquiry stations IX through IY which are controlled by a select clientele. Of course, a large number of inquiry stations would be present in an actual system, and as information is provided from the data station D to the inquiry stations through conventional telephone facilities of the system T, essentially the communication needs within the system are provided simply by each of the stations having a telephone.

In the operation of the system of FIGURE 1, the inquiry station IX, for example, may call the data station D and request certain information as for example the credit status of a particular individual. Thereupon, the desired information is located at the data station and given to the inquiry station IX. In the operation of the present system, the inquiry station IX is verified to the data station D whereby to establish that the inquiry station IX is a true subscriber to the service provided by the data station D. Considering the details of an exemplary inquiry station and data station, reference will now be had to FIGURE 2.

Referring to FIGURE 2, there is shown a handset or telephone instrument 12 located at the inquiry station IX, which instrument is connected in a conventional manner to a telephone system 14 through which, the instrument 12 may be connected to virtually any other telephone station. Specifically for example, the telephone 12 may be connected as by dialing or other means to a telephone system 16 located at the data station which is in turn connected to a telephone instrument 18.

The telephone instrument 12 at the inquiry station IX carries a transducer 20 affixed adjacent the ear piece 12a of the instrument and capable of converting an inaudible sonic tone (e.g. 20,000 cycles) into an electrical signal of similar frequency. The signal from the transducer 20 is applied to a band-pass filter 22 which discriminates against all signals excepting the above-mentioned inaudible frequency, which is passed to energize a relay 24 that controls a binary counter 26 incorporating a visual display panel 28. These elements may take the form of various well known devices interconnected as shown in FIGURE 2.

The telephone instrument 18 carries a transducer 30 adjacent the mouth piece 18a which is capable of forming an inaudible sonic signal (e.g. 20,000 cycles) from a received electrical signal of the same frequency. The frequency of the electrical signal coincides to that passed by the filter 22 at the inquiry stations of the system and is provided from an oscillator 32 as shown. The oscillator 32 has an output connected to a gate 34 qualified by a signal in a conductor 36 which results in the passage of the oscillating signal to the transducer 30. The gate 34 may take the form of various "and" or coincidence gates which function to pass one signal upon receiving a high level of another signal to be qualified.

With the above preliminary consideration, the system of FIGURE 2 may now best be explained by assuming certain initial conditions and describing the operation coincidentally with the introduction of the other elements in the system. Therefore, assume initially that the counter 26 at the inquiry station manifests a binary number 10110 1011 currently identifying that subject or station. The latter four digits in this number, e.g. 1011 are the fixed identification for the inquiry station and do not change as inquiries are made. However, the first five digits of the number, i.e. 10110, represent the dynamic portion of the number and change during each call to maintain the reliability of the verification system.

Assuming now that a person at the inquiry station IX desires to obtain data from the data station, the telephone instrument 12 is raised and telephonic communication is established in a conventional manner between that instrument and the instrument 18 at the data station. Upon initially establishing communication, the operator at the inquiry station reads the number manifest by the panel 28, i.e. 10110 1011 and this information is transmitted through the telephone system 14 and the telephone system 16 to the operator using the instrument 18. Thereupon, the operator at the data station with the instrument 18 punches the received numbers on keys 38 and 40 of a binary register 42 to initiate a test. The keys 40 accommodate the first five digits of the received number and the keys 38 receive the second four digits. Therefore, the binary register 42 (which may comprise a series of flip-flop circuits) is set to coincide with the register 26 at the inquiry station in communication. The digits of the number are presented by the register 42 as binary signals, the latter four of which are applied through conductors 44 to the address input of a memory 46. The memory 46 may take various forms including a coincident-current magnetic-core memory as well known in the prior art.

After the number has been set in the binary register 42, the operator presses a start "test" or "go" button 48 which is connected to provide a high signal to the "read" input of the memory 46 and commands the memory 46 to provide the contents of the location addressed by the input signals to an output register 50. That is, upon receiving a "read" command signal, the memory 46 selects a location determined by the signals received on the conductors 44, and provides the contents of that location to the output register 50. The contents of the output register in the form of five-bit parallel binary signals are applied simultaneously to a comparator 52 and an adder 54. The comparator 52 also receives signals representative of the first five bits of the identifying code number punched into the register 42. These signals are received through conductors 56. Therefore, the comparator 52 receives a five-bit binary number as registered in the register 26 at the inquiry station, and similarly receives a five-bit binary number from a location in the memory 46 identified with the register 26. The coincidence of these two binary numbers indicates the current inquiry station to be valid as asserted.

Various types of known comparator circuits may be employed as the comparator 52 to provide a high output signal in a conductor 58 upon receiving signals indicative of similar binary numbers. One form of the comparator 52 may comprise simply a series of cascaded "and" gates.

A high signal indicating coincidence from the comparator 52 is applied to a signal device 60 which may comprise a light, a bell, or various other devices to indicate to the operator of the instrument 18 that the inquiry station with whom he is communicating is a verified inquiry station. Upon observing the signal from the device 60, the operator with the instrument 18 proceeds to accept the inquiry and provides the desired information or other material. Of course, it is to be understood that the verification operation by the data station is performed so rapidly that no apparent pause exists in the conversation. During the course of the conversation, subsequent to verification, the data station system functions to increment the value indicated by the register 26, and the associated value from the memory 46, preparatory to the next inquiring call. The manner in which this operation is accomplished will now be considered in detail.

The signal indicating an approved inquiry station appearing in the conductor 58 is also applied to a random-number generator 64, a single rotation motor 66, and a delay circuit 68. Upon receiving the signal, the random-number generator 64 provides a signal-represented five-bit binary number on five output conductors 70 which are connected to the adder 54 and to a rotary distributor 72. The random-number generator may comprise various devices including a magnetic drum with a plurality of random numbers thereon, which are provided to the conductors 70 upon receiving a signal as from the conductor 58.

The random-value number carried by the conductors 70 and applied to the adder 54 is added to the numerical value manifest by signals in the conductors 62 from the memory 46. Therefore, these two values are added and returned to the addressed memory location through conductors 78 upon the appearance of the approved signal from the delay circuit 68. As a result, the variable value in the memory location of the memory 46 associated with the particular inquiry station in communication is altered by a predetermined random number. That is, the adder 54 which may comprise a conventional binary parallel adder additively combines the signals from the random-number generator and the signals from the memory 46 to form a new set of signals which are returned to the memory 46 when the memory receives a signal from the delay circuit 68 commanding a "write" operation.

To maintain the remotely registered value in coincidence with this alteration, it is necessary to alter the contents of the register 26 at the inquiry station. To accomplish this operation, the signals from the random-number generator 64 are converted into a series of pulses by a distributor 72 passing through a single revolution under control of the single-rotation motor 66. The distributor 72 has a plurality of stationary contacts 73 which are sequentially engaged by a rotary contact 75 driven by the single-rotation motor 66. The first contact 73 engaged by the rotary contact 75 is connected to the conductor 70a which carries the least-significant binary digit. The next two stationary contacts 73 are connected to the conductor 70b which carries the next least significant digit. The next four stationary contacts 73 are associated with another conductor, as are the next eight and the next sixteen. Therefore, as the rotary contact 75 passes through a cycle of rotation it receives a number of pulses which is equal the binary value from the random-number generator 64. This series of pulses is received by the conductor 36 to qualify the gate 34 and permit a series of burst signals to be applied to the transducer 30. These burst signals are transformed to a sonic form by the transducer 30 then sent through the telephone system 16 to the telephone system 14 and received at the ear piece of the instrument 12. Upon being manifest at the instrument 12, the burst signals are detected by the transducer 20 reconverted to an electrical form, and passed through the band-pass filter 22 to energize the relay 24. Each energization of the relay 24 steps the counter 26 in binary fashion to increment the contents by the same value as the altered number registered in the memory 46.

Of course these operations occur exceedingly rapidly so that the counter 26 is incremented promptly after the inquiry station is recognized as an approved station. As a result, the value in the register 26 will invariably be incremented well prior to the termination of the conversation between the operators using the instruments 12 and 18.

Upon the conclusion of their conversation, the operators simply hang up the instruments 12 and 18 and the registers associated with their stations have been incremented to again verify the inquiry station during the next call.

With the code number being continually changed as in the system of FIGURE 2, there is very little likelihood of counterfeit use of the code number. However, the code number does remain the same between telephonic inquiries and it is possible that the number could be used from another station before the valid station employed the number to accomplish a change. One form of the present invention incorporating a mode of operation to avoid such possibility is shown in FIGURE 3 and will now be considered in detail.

In the system of FIGURE 3, an inquiry station IX is provided which includes similar structure to the inquiry station shown and described with reference to FIGURE 2. In the system of FIGURE 3, the data station is used in conjunction with a telephone instrument 76 which functions in conjunction with a telephone system 78 and has a transducer 80 affixed adjacent the mouth piece. The transducer 80 is connected to receive a signal from a coincidence gate 82 which in turn receives an oscillatory signal from an oscillator 84 and a qualifying pulse signal from a pulse generator 86.

Considering the system as it operates, assume that the operator at the data station has just established communication with an operator at the inquiry station IX. At the outset of this communication, the operator at the inquiry station IX speaks the four digits permanently associated with the station to the operator at the data station and upon receiving these digits the operator at the data station keys them into the address register 88 then pushes a key 86a to cause the pulse generator 86 to operate. The output from the address register 88 comprises a parallel signal-represented binary value carried on four conductors 90 which are applied to a serial memory 92. The serial memory 92 may take the form of a magnetic drum, or various other devices, and provides a five-bit serial output signal to an output line 94 indicative of the contents of the location addressed by the signals in the conductors 90. These output signals are applied to an adder 96 which also receives a pulse from the pulse generator 86, thereby incrementing the numerical value by one and applying the incremented value to a display register 98. The incremented value is also returned to the serial memory 92 through a conductor 100 and entered in the addressed location from which it was taken.

Simultaneously with the above operations, the pulse generator 86 qualifies the gate 82 permitting a burst from the oscillator 84 to pass through the gate 82 to the transducer 80. As a result, a pulse is received at the inquiry station IX incrementing the variable contents of the register 26. Thereafter, the operator at the inquiry station reads these five digits to the operator at the data station who observes the display register 98 for coincidence. Of course, the occurrence of coincidence indicates an authorized inquiry station.

It is to be noted, that in the system of FIGURE 3, the numerical value developed for each client is indicative of the number of calls which that client makes. Therefore, if the client is charged on the basis of the number of inquiries, this value may be employed for billing purposes. However, if such an arrangement is not desired, it may be advantageous to provide a random-number generator in the system to replace the pulse generator 86 as shown and described with reference to FIGURE 2.

In view of the above embodiments, it is readily apparent that a system of the present invention provides positive identification of stations in telephonic communication with a central station and furthermore that the system is economical as well as simple in use.

It is also apparent that a large variety of possible combinations for the system exist. That is, a portion of the communication may be carried on by pulse signals to accomplish verification, and a portion may be performed orally, or alternatively, the entire communication may be carried on in a single form. All such variations are within the scope of the teachings presented here, therefore, the present invention is not to be limited in accordance with the embodiments described above, but rather is to be defined by the appended claims set forth below.

What is claimed is:

1. A validation system for use in cooperation with a communication means whereby a data station can be contacted by any of a plurality of inquiry stations, said system for validating identification of a subject at an inquiry station, comprising:

remote means at said inquiry station for providing fixed data indicative of said subject and variable data currently identifying said subject;

means for communicating said data from said remote means to said data station, over said communication means;

memory means at said data station having a plurality of locations each for recording variable signals currently identifying a subject;

address means for receiving said fixed data from said remote means specifying a certain location in said memory means;

comparator means for receiving said variable data from said remote means and said variable signals from said certain location in said memory means to compare such for predetermined coincidence;

means to alter said variable signals to provide varied signals;

means to register said varied signals in said certain location in said memory; and means to return said varied signals to said remote means for recording as variable data.

2. A system according to claim 1 wherein said means to alter includes a random generator for generating sets of random numerical signals; and arithmetic combination means for arithmetically combining said one set of variable signals and said random numerical signals.

3. A validation system for use in cooperation with a communication means whereby communication is established between stations, said system for validating the identification of a subject located at one station and manifesting such validation at another station during a test operation, comprising:

means to initiate said test operation;

means to provide electrical identification code signals asserted as currently identifying said subject during a test operation;

means at said other station for registering identification code signals for said subject, and providing representative electrical identification code signals during a test operation;

a comparator means at said other station for receiving said electrical identification code signals asserted as currently identifying said subject, and said electrical identification code signals from said means at said other station, said comparator means for comparing received electrical signals during a test operation to indicate prearranged coincidence as validation;

means for providing varied electrical identification code signals from one of said electrical identification code signals; and means to communicate said varied electrical identification code signals to said means for registering and to said one station through said communication means for registration at said one station by said remote means.

4. A validation system for use in cooperation with a communication means whereby a data station can be contacted by any of a plurality of inquiry stations, said system for validating identification of a subject at an inquiry station, comprising:

manual control means at one of said stations for initiating a test operation for a subject at an inquiry station in communication with said data station through said communication means;

remote means at said inquiry station for providing fixed data indicative of said subject and variable data currently identifying said subject during said test operation;

means for communicating said data from said remote means to said data station, over said communication means;

memory means at said data station having a plurality of locations each for recording variable signals currently identifying a subject;

address means for receiving said fixed data from said remote means for specifying a certain location in said memory means;

comparator means for receiving said variable data from said remote means and said variable signals from said certain location in said memory means to compare such during said test operation;

means to alter said variable signals to provide varied signals during said test operation;

means to register said varied signals in said certain location in said memory during said test operation; and means to return said varied signals to said remote means for recording as variable data during said test operation.

5. A system according to claim 4 wherein said communication means comprises a telephonic system.

6. A telephonic verification system for identifying a subject at one location remote from another location which locations are linked by telephone means comprising:

a register at said one location containing signals currecently representative of said subject in an assigned portion thereof;

a comparator means at said one location for providing a validity signal upon detecting predetermined coincidence between data signals;

first signal means for providing first data signals to said comparator means representative of data from said other location;

second signal means for providing second data signals to said comparator means representative of signals from said register, currently representative of said subject;

alteration means for performing an arithmetic variation of one of said data signals to provide varied data signals;

registration means for fixing said varied data signals in said assigned portion of said register;

control means for said system to cause said comparator to compare said first and second data signals to provide an indication of identification, and to control said alteration means and said registration means to record said varied data signals in said register; and signal transfer means including said telephone means to communicate said arithmetic variation to said other locations.

7. A telephonic verification system for verifying the identification of a subject over a telephone system, from one station to another, which subject is identified by a fixed data code and a variable data code, which codes are registered in a register individual to said subject, comprising:

a register means having a plurality of storage spaces for registering variable data codes, said spaces being designated by said fixed data codes;

signal means to provide electrical signals representative of said fixed data code and said variable data code as provided over said telephone system;

address means coupled to said register means and connected to receive said electrical signals representative of said fixed data code from said signal means whereby to provide electrical signals representative of a registered variable data code from a space of said register means designated by the receiving fixed data code;

comparator means for comparing electrical signals from said signal means representative of said variable data code to electrical signals from said register means representative of said variable code data whereby to indicate predetermined coincidence;

alteration means operative to alter said electrical signals representative of said variable data code to provide electrical signals representative of an altered variable data code;

signal return means for registering said signals representative of an altered variable data code in said space being designated in said register means; and control means for actuating a comparison by said comparator means, an alteration by said alteration means and a registration by said signal return means.

8. A telephonic verification system for verifying the identification of a subject over a telephone system, from one station to another, which subject is identified by a fixed data code and a variable data code, which codes are registered in a register individual to said subject, comprising:

a register means having a plurality of storage spaces for registering variable data codes, said spaces being designated by said fixed data codes;

signal means to provide electrical signals representative of said fixed data code and said variable data code as provided over said telephone system;

address means coupled to said register means and connected to receive said electrical signals representative of said fixed data code from said signal means whereby to provide electrical signals representative of a registered variable data code from a space of said register means designated by the received fixed data code;

comparator means for comparing electrical signals from said signal means representative of said variable data code to electrical signals from said register means representative of said variable code data whereby to indicate predetermined coincidence;

means for providing a set of random electrical signals;

combining means for arithmetically combining said set of random electrical signals and electrical signals representative of said variable data code to provide electrical signals representative of an altered variable data code;

signal return means for registering said signals representative of an altered variable data code in said space being designated in said register means;

control means for operation to actuate said comparator means, said combining means and said signal return means.

9. A system according to claim 8, further including a plurality of remote subject registers and further including means to modify the variable data codes registered in said subject registers in accordance with said random electrical signals.

10. A validation system for use in conjunction with a data station and a plurality of approved remote receiving stations, which communicate as by telephone, comprising:
- a plurality of registers individually located respectively at said receiving stations and each for registering signals representative of an identification code designation and manifesting same at the located receiving station;
- storage means located at said data station for registering a plurality of signals representative of identification code designations;
- address means for addressing locations in said storage means assigned to each of said remote stations wherein signals representative of identification code designations for each of said remote stations are registered;
- control means for controlling said address means to provide the contents of a particular location from said storage means;
- comparison means connected to receive and compare signals representative of an identification code designation contained in one of said registers at one of said receiving stations with signals from a location in said storage means assigned to said one of said receiving stations for providing a validation signal upon prearranged coincidence of compared signals;
- means for generating change signals representative of a random number; and
- change means for receiving said change signals to similarly alter said signals representative of an identification code designation contained in said one of said registers and said signals in said storage means assigned to said one of said receiving stations during communication between said data station and said one receiving station.

References Cited by the Examiner
UNITED STATES PATENTS

| | | | |
|---|---|---|---|
| 2,737,342 | 3/1956 | Nelson | 340—153 X |
| 2,910,238 | 10/1959 | Miles et al. | 340—153 X |
| 3,171,108 | 2/1965 | Mackeen | 340—152 X |

NEIL C. READ, *Primary Examiner.*

P. XIARHOS, L. HOFFMAN, D. YUSKO,
*Assistant Examiners.*